United States Patent [19]
Kostanian

[11] Patent Number: 6,143,178
[45] Date of Patent: Nov. 7, 2000

[54] MULTI-STAGE EXTRACTION PROCESS

[75] Inventor: Artak Eranosovich Kostanian, Leverkusen, Germany

[73] Assignee: Bayer Aktiengesellschaft, Leverkusen, Germany

[21] Appl. No.: 09/043,898

[22] PCT Filed: Oct. 11, 1996

[86] PCT No.: PCT/EP96/04423

§ 371 Date: Mar. 27, 1998

§ 102(e) Date: Mar. 27, 1998

[87] PCT Pub. No.: WO97/14487

PCT Pub. Date: Apr. 24, 1997

[30] Foreign Application Priority Data

Oct. 19, 1995 [RU] Russian Federation ......... N 95117738
Oct. 19, 1995 [RU] Russian Federation ......... N 95117767

[51] Int. Cl.[7] ............................ B01D 11/04; B01D 12/00
[52] U.S. Cl. ........................... 210/634; 210/511; 422/256
[58] Field of Search ................................... 210/511, 634; 422/256

[56] References Cited

U.S. PATENT DOCUMENTS

4,028,462  6/1977  Domic et al. ............................. 423/24
4,111,660  9/1978  Kabasawa et al. ...................... 210/634
5,575,918  11/1996  Virnig et al. ............................. 210/652

*Primary Examiner*—Matthew O. Savage
*Assistant Examiner*—Terry K. Cecil
*Attorney, Agent, or Firm*—Norris, McLaughlin & Marcus, P.A.

[57] ABSTRACT

A process for multi-phase extraction is carried out in an extraction apparatus comprising a multiplicity of stages connected in series, wherein each stage comprises an extraction and a reextraction chamber. In the extraction chamber, a raffinate phase is brought into contract with an extractant, which is reextracted in contact with an extract phase in a reextraction chamber. In the course of the process, the extractant is conveyed in cross-flow to the extract and raffinate phases within the same stage in each case, while the raffinated and extract phases are conveyed through some or all of the stages in counter-current flow. The extractant is a continuous phase and the raffinate and extract are dispersed phases. The circulating flow of the extractant is maintained between the extraction and reextraction chambers solely due to the density differences of the dispersed phases in relation to the continuous phase.

5 Claims, 6 Drawing Sheets

FIG. 9    FIG. 10

MULTI-STAGE EXTRACTION PROCESS

This invention relates to a process for multi-phase extraction in an extraction apparatus comprising a multiplicity of separating stages connected in series, wherein each stage comprises an extraction and a reextraction chamber, and wherein a raffinate phase is brought into contact with an extractant in the extraction chamber and the extractant is reextracted in contact with an extract phase in the reextraction chamber.

Extraction processes of this type are used in the chemical, hydrometallurgical and microbiological industries, and in other branches of industry, for the separation, concentration and purification of substances.

Single-stage apparatuses for carrying out three-phase liquid extraction processes are known in the form of a two-chamber system, wherein the two chambers are joined to each other at their upper parts or comprise a porous partition wall. The chambers are filled with a continuous phase through which two dispersed phases are passed which are insoluble in the continuous phase are passed in the form of droplets. A transfer of substances is thereby effected from one dispersed phase (the raffinate phase), through the continuous phase forming the extractant, into the other dispersed phase (the extract phase). This process is described, for example, in the journal "Theoretische Grundlagen der chemischen Technologie" 1984, Part 18, No. 6, pages 736–738).

Moreover, a three-phase extractor in which a first and a second chamber are filled with the continuous phase is known from Russian Patent Application No. 94-015776/26. The chambers have devices for the dispersion of the raffinate and extract phases, and are connected to each other by overflows for the circulation of the continuous phase. The overflows are constructed in the form of pipes which connect the upper and lower parts of each chamber to each other. The extractor is provided with connection pieces for the feeding and discharge of the raffinate and extract phases.

The raffinate phase and the extract phase are each broken down into droplets in the corresponding chamber, by means of a dispersing device. These droplets move through the continuous phase as a cluster of droplets. When the density differences between the raffinate phase, the extract phase and the continuous phase are appropriately selected and adjusted, continuous circulation through the top and bottom overflows is effected solely due to the density difference between the emulsions in the first and second chambers, so that a transfer occurs of the substance to be extracted from one chamber into the other, and thus from the disperse raffinate phase into the disperse extract phase, with the continuous phase functioning as the transport medium (carrier).

It is also known that a plurality of separating stages can be disposed in series in the extraction apparatus described above in order to increase the separation effect. In principle, various options are open for conveying the individual phases through the separating stages and for connecting the separating stages to each other.

The underlying object of the present invention is to improve the efficacy of a multi-stage extraction process by the optimum conveying of phases and the optimum coupling of separating stages. Of particular interest in this respect is the economic and efficient separation of systems of substances in which the distribution of the substance to be extracted between the individual phases is very low. When using conventional multi-stage extraction processes, separation problems such as these can only be solved with the aid of a very large number of separating stages, so that the process becomes uneconomic.

Starting from the process described at the outset, this object is achieved according to the invention by conveying the extractant in cross-flow to the extract and raffinate phases within the same separating stage in each case, whilst the raffinate and extract phases are conveyed through some or all of the separating stages in counter-current flow.

In the course of this process, the extractant can be caused to circulate in cross-flow to the extract and raffinate phases in the same separating stage in each case. Alternatively, however, the extractant can be conveyed through all the stages counter-current to the raffinate phase and co-current to the extract phase or the other way round, namely co-current to the raffinate phase and counter-current to the extract phase.

The process according to the invention is preferably conducted so that within a stage the raffinate phase is dispersed in the extractant forming the continuous phase in a dispersion zone of the extraction chamber and the extract phase is dispersed in the extractant forming the continuous phase in a dispersion zone of the reextraction chamber, and so that within the same stage the continuous liquid phase which is enriched with the extracted substance is fed from the extraction chamber to the dispersion zone of the reextraction chamber, and the continuous liquid phase which is depleted in the reextraction chamber is fed to the dispersion zone of the extraction chamber in the same chamber or in the next chamber. When a mixer-settler system is used for extraction and reextraction, this procedure corresponds to single-stage cross-flow operation.

The process according to the invention is advantageously conducted as a three-phase extraction process, wherein a) a liquid is used as the raffinate phase, the density of which liquid is greater than or less than the density of the extractant, and b) a liquid is used as the extract phase, the density of which liquid is less than the density of the extractant if the density of the raffinate phase is greater than the density of the extractant, and the density of which liquid is greater than the density of the extractant if the density of the raffinate phase is less than the density of the extractant, so that a circulating flow of the continuous phase is maintained between the extraction and reextraction chambers solely due to the density differences of the disperse phases in relation to the continuous phase.

Surprisingly, it has been found that in the process according to the invention the separating effect, and thus the efficacy, increases more steeply as a function of the number of separating stages compared with known multi-stage extraction processes. This means that, by comparison with conventional extraction processes, difficult separation problems involving unfavourable distribution coefficients can be solved with a smaller number of separating stages in the apparatus.

The invention is explained in more detail below with reference to examples of embodiments and with reference to the drawings.

In the multi-stage extraction apparatuses shown in FIGS. 1–5, the separating stages each consist of an extraction chamber 1 and a reextraction chamber 2. In the extraction chambers 1, the extractant is loaded with the substance to be extracted from the raffinate phase. In the reextraction chambers 2, the extractant releases the substance which has been extracted to the extract phase.

Figure 1:
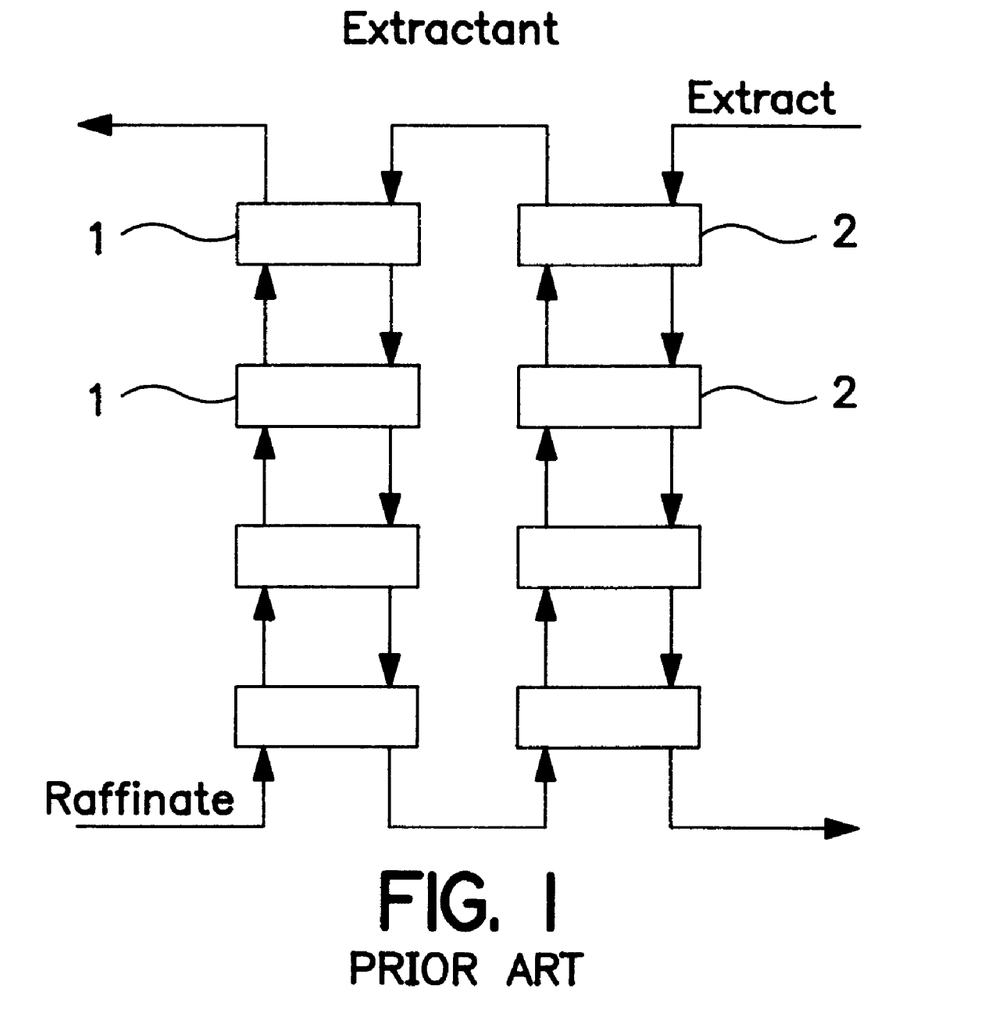
FIG. 1 is a process diagram for a multi-stage extraction process according to the prior art.

With the conventional counter-current connection system shown in FIG. 1, the extractant is conveyed from top to bottom, and counter-current to the raffinate phase, through the extraction chambers 1 in series, and is thereafter passed, counter-current to the extract phase and from bottom to top, through the reextraction chambers 2. The individual separating stages are directly connected in series, and the extractant is circulated or pumped round through an external circuit.

Figure 2:
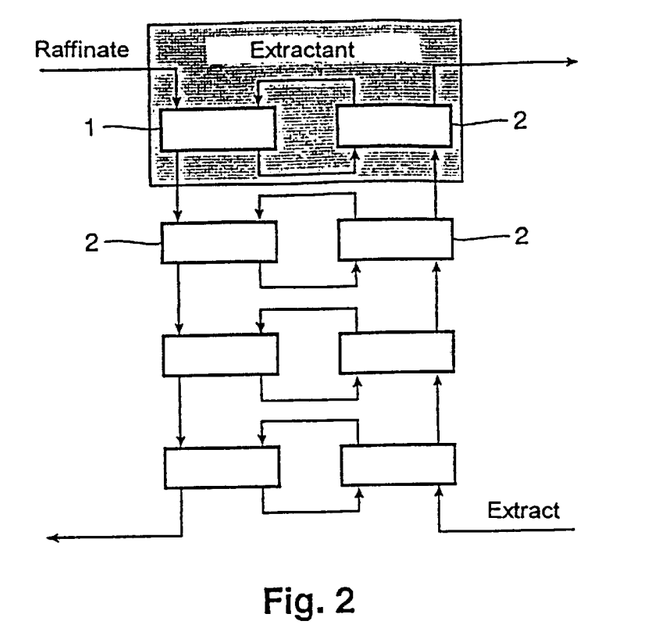
FIG. 2 is a process diagram showing the connection of the separating stages in series, with internal circulation of the extractant in the stages.
Figure 3:
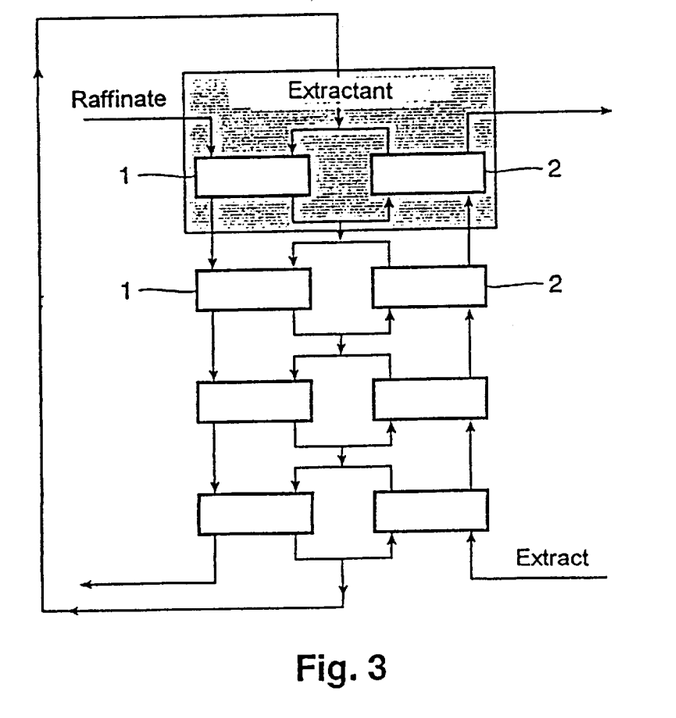
FIG. 3 is a process diagram showing the connection of the separating stages in series, with internal and partial external circulation of the extractant, wherein a partial stream is conveyed co-current to the raffinate phase and counter-current to the extract phase.

In contrast, with the phase conveying systems and separating stage connection systems according to the invention which are shown in FIGS. 2 and 3, the extractant is caused to circulate in cross-flow to the extract phase and to the raffinate phase in the same separating stage in each case, whilst the raffinate phase and the extract phase are conveyed through all the stages in counter-current flow. The extractant is thus recirculated by internal partial circulation, with or without external recycling.

Figure 4:
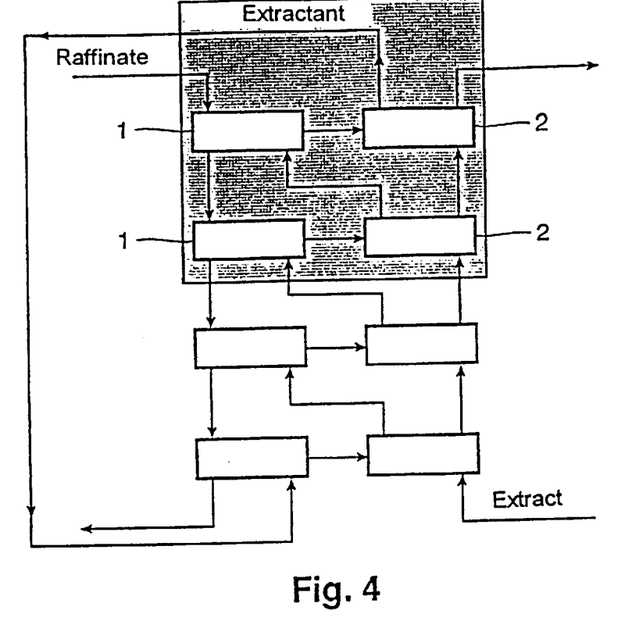
FIG. 4 is a process diagram showing the connection of the separating stages in series, with total external circulation of the extractant, wherein the extractant is conveyed counter-current to the raffinate phase and co-current to the extract phase.
Figure 5:
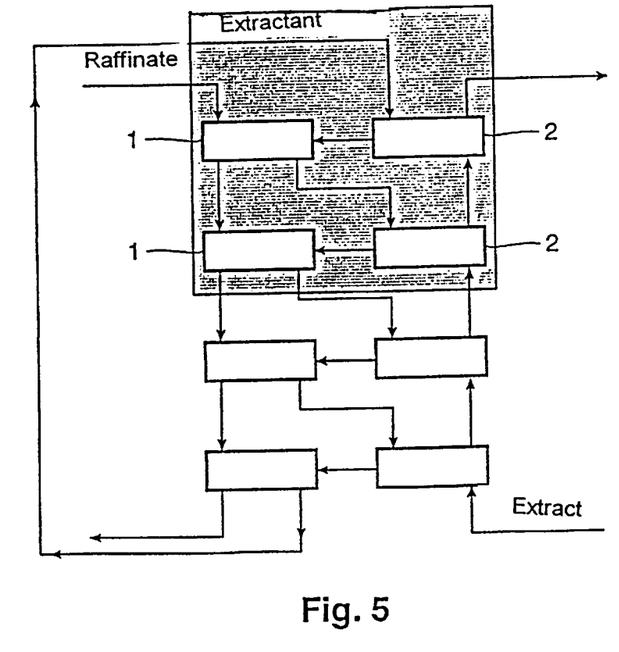
FIG. 5 is a process diagram showing the connection of the separating stages in series, with total external circulation of the extractant, wherein the extractant is conveyed co-current to the raffinate phase and counter-current to the extract phase.

In the modified phase conveying systems according to the invention which are shown in FIGS. 4 and 5, the extractant is likewise conveyed in cross-flow to the raffinate and extract phases within the same stage, but is conveyed through all the stages counter-current to the raffinate phase and co-current to the extract phase (see FIG. 4), or the other way round, namely co-current to the raffinate phase and counter-current to the extract phase (see FIG. 5).

In both these process conveying systems, within a stage the liquid raffinate phase is dispersed and finely distributed in the extractant forming the continuous liquid phase in a dispersion zone of the extraction chambers 1, and the liquid extract phase is dispersed and finely distributed in the extractant forming the continuous liquid phase in a dispersion zone of the reextraction chambers 2. As it flows through the extraction chambers, the continuous phase becomes enriched in the substance to be extracted from the dispersed raffinate phase. The enriched continuous liquid phase is then conveyed, within the same separating stage, into the dispersion zone of the reextraction chamber 2. In contact with the disperse extract phase there, depletion of the continuous phase takes place, and enrichment of the extract phase accordingly takes place. The depleted continuous liquid phase is then again fed to the dispersion zone of the extraction chamber 1 of the same or of the next separating stage, so that an internal or sequential circulation of the continuous phase takes place in each separating stage.

Figure 6:
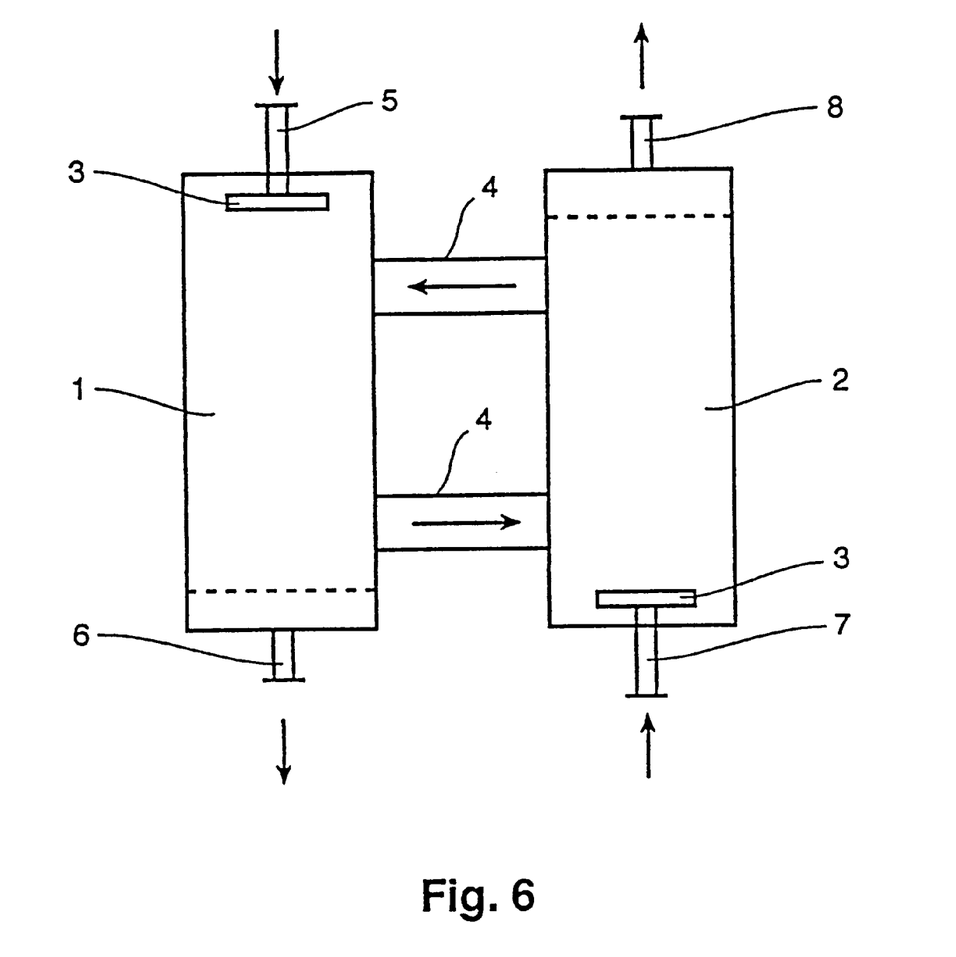
FIG. 6 shows a design of a separating stage as a three-phase extractor.

Three-phase extraction stages as shown in FIG. 6 have proved useful for the practical implementation of the process according to the invention. A liquid is preferably used as the raffinate phase here, the density of which liquid is greater than or less than the density of the extractant. A liquid is then used as the extract phase, the density of which liquid is less than the density of the continuous phase or extractant if the density of the raffinate phase is greater than the density of the continuous phase, and the density of which liquid is greater than the density of the liquid phase if the density of the raffinate phase is less than the density of the continuous phase extractant, so that a circulating flow of the continuous phase extractant can be maintained between the extraction and reextraction chambers, solely due to the density differences of the disperse phases in relation to the continuous phase.

The three-phase extraction stage basically consists of the extraction chamber 1 and the reextraction chamber 2, which are both provided with a dispersion device 3. In their upper and lower parts, the chambers 1 and 2 are connected by connecting channels or overflows 4. Depending on the density of the disperse phases, the separating stage has to be operated so that the phase boundaries of the phases in contact are situated above or below the connections between the chambers 1 and 2. The three-phase extraction stage is equipped with connection pieces 5 and 6 for the feeding and discharge of the raffinate phase and with connection pieces 7 and 8 for the feeding and discharge of the extract phase.

Figure 7:
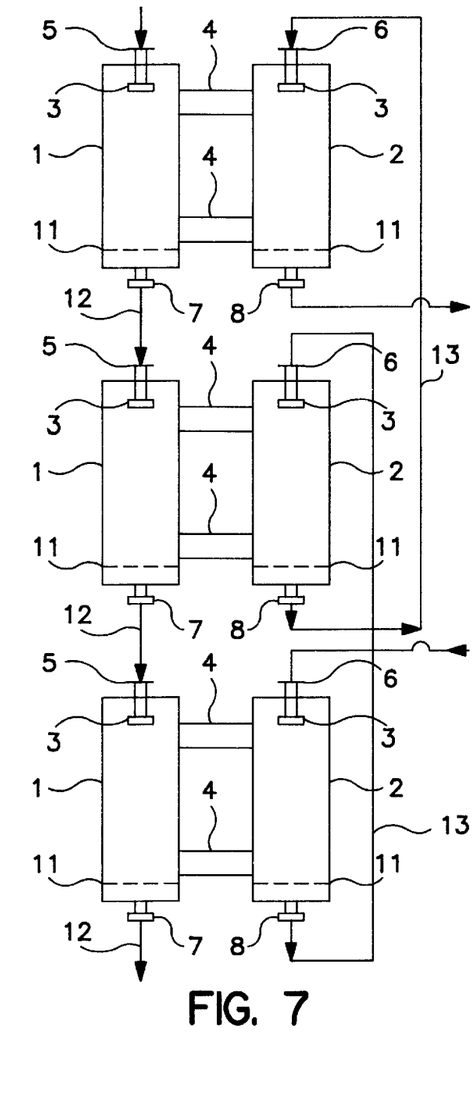
FIGS. 7–10 show examples of embodiments of the connection of multi-stage three-phase extractors.
Figure 8:
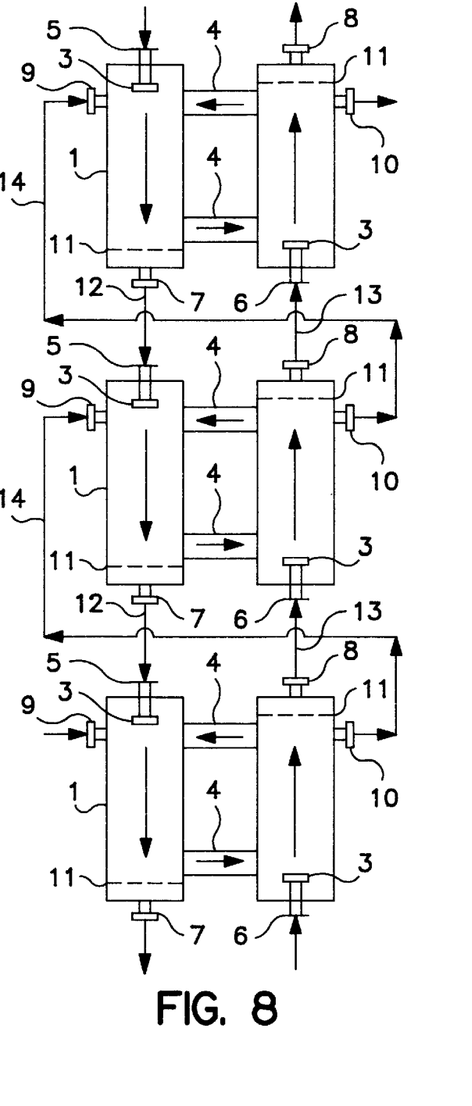

FIGS. 7 and 8 illustrate multi-stage three-phase extractors, in which the chambers 1 and 2 are connected in series in a system of separating stages and are connected to each other so that the flow situations shown in the process diagrams of FIGS. 2 and 3 can be realised. Chambers 1 and 2 are again both provided with a dispersion device 3. In their upper and lower parts, chambers 1 and 2 are connected by connecting channels or overflows 4.

Depending on the density and/or on the proportions of the disperse phases, the phase boundary of the phases in contact has to be situated above or below the connections between chambers 1 and 2. The stages are equipped with connection pieces 5 and 6 for the feeding of the disperse extract and raffinate phases, and with connection pieces 7 and 8 for the discharge of the disperse extract and raffinate phases. Furthermore, in the variant shown in FIG. 8 a connection piece 9 is provided for the feeding of the continuous phase and a connection piece 10 is provided for the discharge of the continuous phase. For the further conveying of the disperse phases, chambers 1 of different stages are connected to each other via connecting lines 12 and chambers 2 are connected to each other via connecting lines 13. Moreover, in the embodiment shown in FIG. 8, a connecting line 14 is provided in addition for the further conveying of the continuous phase between the stages.

The multi-stage three-phase extractors shown in FIGS. 7 and 8 operate according to the following principle:

The extraction chambers 1 and reextraction chambers 2 are filled with the extractant as a continuous phase. The raffinate phase and the extract phase are fed into the chambers via the connection pieces 5 and 6 and the dispersion devices 3. Depending on the densities of the liquids to be brought into contact, the droplets of the dispersed phase in chambers 1 and 2 move upwards or downwards and coalesce at the phase boundary 11. This process of dispersion and coalescence is repeated in each stage. The two disperse phases are discharged at the first and last stage of the apparatus by means of connection pieces 8 and 7. As the clusters of droplets move through chambers 1 and 2, dispersions of different densities are formed. Consequently, an ascending movement of the continuous phase occurs, and on the other side a descending movement of the continuous phase occurs. This results, solely due to the force of gravity, in the circulation of the continuous phase between chambers 1 and 2. The continuous phase circulates through chambers 1 and 2 and through the connecting channels 4, and in the embodiment shown in FIG. 8 is conveyed in addition from stage to stage via the connecting lines 14.

Figure 9:
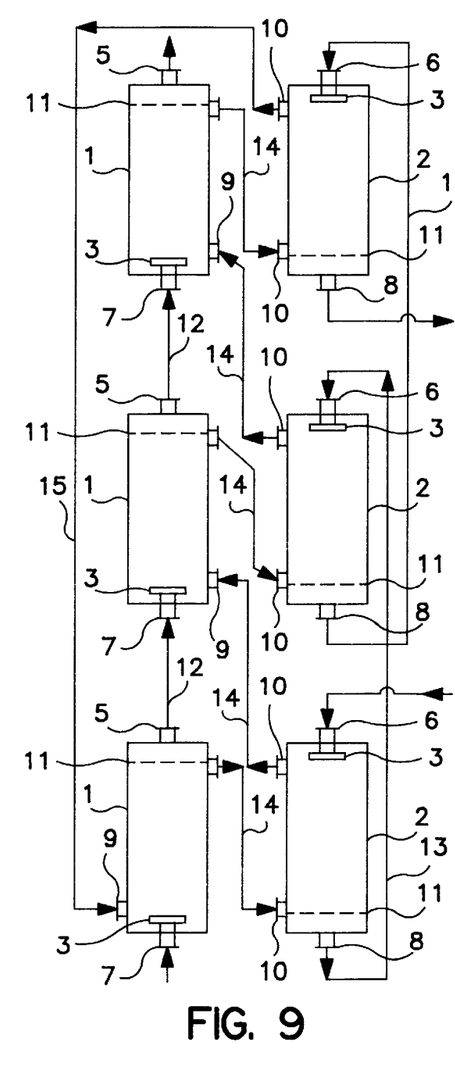
Figure 10:
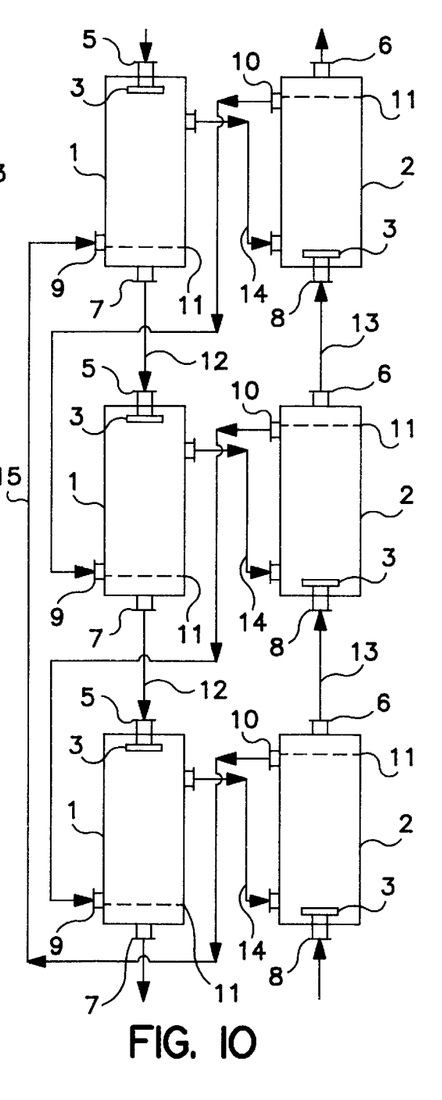

FIGS. 9 and 10 illustrate further variants of multi-stage three-phase extraction apparatuses for carrying out the process according to the invention in accordance with the process diagrams of FIGS. 4 and 5.

In both embodiments, the multi-stage three-phase extractor again consists of separating stages comprising extraction chambers 1 and reextraction chambers 2, which are equipped with dispersion devices 3. The stages are again arranged one below another in the apparatus, and are connected to each other by connecting lines 12 and 13 for the disperse raffinate and extract phases and by connecting lines 14 for the further conveying of the continuous phase from stage to stage. The extractor is again provided with connection pieces 5 and 6 (as shown in FIG. 9) or 6 and 7 (as shown in FIG. 10) and with connection pieces 7 and 6 (as shown in FIG. 9) for the discharge of the raffinate and extract phases or with connection pieces 7 and 6 (as shown in FIG. 9) and connection pieces 5 and 8 (as shown in FIG. 10) for the feeding of the raffinate and extract phases, and is also provided with connection pieces 9 and 10 for the feeding and discharge of the continuous phase and with a return line 15 for the external circulation of the continuous phase.

The multi-stage three-phase extractors shown in FIGS. 9 and 10 operate according to the following principle:

The chambers 1 and 2 of the stages are filled with the extractant as a continuous phase. The phases to be dispersed are fed to chambers 1 and 2 of the stages through the connection pieces 5 and 6 and via the dispersion devices 3. Depending on the densities of the dispersed phases, the clusters of droplets in chambers 1 and 2 move upwards or downwards and coalesce at the phase boundary 11. These processes of dispersion and coalescence are repeated in each stage. The continuous phase flows through the individual stages in series, through the connections 14. In the lowermost stage of the embodiment shown in FIG. 9, the raffinate phase is fed to the lowermost stage via the connection piece 7 and the extract phase is fed to the lowermost stage via the connection piece 6. The continuous phase flows from bottom to top, from chamber 2 of the lowermost stage and across to chamber 1 of the stage above. It then flows into chamber 2 of the same stage and from there across to chamber 1 of the next stage above, and so on as far as the uppermost stage, from which it is recirculated by the return line 15 into chamber 1 of the lowermost stage. The flow situation as a whole is characterised in that the continuous phase is fed co-current to the disperse raffinate phase in all the chambers 1 and is fed through all the chambers 2 counter-current to the disperse extract phase.

In the embodiment shown in FIG. 10, the raffinate phase is fed via the connection piece 5 to the uppermost stage and the extract phase is fed via the connection piece 8 to the lowermost stage. The continuous phase flows from top to bottom and flows across between the chambers of adjacent stages; thus in all the chambers 1 it flows counter-current to the raffinate phase and in all the chambers 2 it flows co-current to the extract phase.

As it flows through chambers 1 and 2, the continuous phase comes into contact with the first and second disperse phases in succession. In the course of this process, mass transfer occurs from one disperse phase (raffinate phase) into the other (extract phase) via the continuous phase (extractant).

The disperse phases leave the apparatus through connection pieces 5 and 8 at the first stage (FIG. 9) or through connection piece 7 at the last stage and through connection piece 6 at the first stage (FIG. 10). In contrast, the continuous phase circulates through the extractor through connection pieces 9 and 10, through connections 14, and through the return line 15 which closes the circuit.

By appropriately selecting the density differences between the individual phases and/or by adjusting the mass flows of the disperse phase constituents, the circulating flows can be produced by the force of gravity alone. However, there is no obstacle to the use of pumps, e.g. in the return line 15, for conveying the continuous phase in circulation.

What is claimed is:

1. A process for multi-stage extraction in an apparatus comprising a multiplicity of separating stages connected in series, wherein each said separating stage comprises an extraction and a reextraction chamber, and wherein a raffinate phase containing a substance is brought into contract with an extractant in the extraction chamber to extract said substance and the extractant is brought into contact with an extract phase in the reextraction chamber to reextract said substance, wherein the extractant is a continuous phase and the raffinate and extract are dispersed phases, the extractant is conveyed in cross-flow to the extract and raffinate phases within the same separating stage in each case, the raffinate and extract phases are conveyed through some or all of the separating stages in counter-current flow and a. said raffinate phase is a first liquid having a first density and said extractant phase is a second liquid having a second density, wherein said first density is greater than or less than said second density, and b. said extract phase is a third liquid having a third density, wherein said third density is less than said second density if said first density is greater than said second density, and wherein said third density is greater than said second density if said first density is less than said second density, so that a circulating flow of the extractant is maintained between the extraction and reextraction chambers solely due to the density differences of the dispersed phases in relation to the continuous phase.

2. A process according to claim 1, characterised in that the extractant is caused to circulate in cross-flow to the extract and raffinate phases within the same stage in each case.

3. A process according to claim 1, characterised in that the extractant is conveyed through all the stages counter-current to the raffinate phase and co-current to the extract phase.

4. A process according to claim 1, characterised in that the extractant is conveyed through all the stages co-current to the raffinate phase and counter-current to the extract phase.

5. A process according to claim 1, characterised in that:

a) within a stage the raffinate phase is dispersed in the extractant forming the continuous phase in a dispersion zone of the extraction chamber and the extract phase is dispersed in the extractant forming the continuous phase in a dispersion zone of the reextraction chamber, b) and that within the same stage the continuous liquid phase which is enriched with the extracted substance is fed from the extraction chamber into the dispersion zone of the reextraction chamber, and the continuous liquid phase which is depleted of the extracted substance in the reextraction chamber is fed to the dispersion zone of the extraction chamber in the same stage or in the next stage.

\* \* \* \* \*

UNITED STATES PATENT AND TRADEMARK OFFICE
CERTIFICATE OF CORRECTION

PATENT NO. : 6,143,178
DATED : November 7, 2000
INVENTOR(S) : Kostanian

It is certified that error appears in the above-identified patent and that said Letters Patent is hereby corrected as shown below:

<u>Title page,</u>
ABSTRACT, delete "while" and substitute -- whilst --

Signed and Sealed this

Thirtieth Day of April, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.   : 6,143,178
DATED        : November 7, 2000
INVENTOR(S)  : Artak Eranosovich Kostanian It is certified that error appears in the above-identified patent and that said Letters Patent is hereby corrected as shown below:

<u>Title page,</u>
ABSTRACT,
Line 5, delete "contract" and substitute -- contact --.

<u>Column 6,</u>
Line 19, delete "contract" and substitute -- contact --.

Signed and Sealed this

Sixteenth Day of July, 2002

*Attest:*

*Attesting Officer*

JAMES E. ROGAN
*Director of the United States Patent and Trademark Office*